(12) United States Patent
Xie et al.

(10) Patent No.: US 11,895,509 B2
(45) Date of Patent: Feb. 6, 2024

(54) INFORMATION REPORTING METHOD, INFORMATION RECEIVING METHOD, AND DEVICE

(71) Applicants: China Mobile Communication Co., Ltd Research Institute, Beijing (CN); China Mobile Communications Group Co., Ltd., Beijing (CN)

(72) Inventors: Fang Xie, Beijing (CN); Na Li, Beijing (CN); Guangyi Liu, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 492 days.

(21) Appl. No.: 17/264,987

(22) PCT Filed: Jul. 26, 2019

(86) PCT No.: PCT/CN2019/097858
§ 371 (c)(1),
(2) Date: Feb. 1, 2021

(87) PCT Pub. No.: WO2020/024875
PCT Pub. Date: Feb. 6, 2020

(65) Prior Publication Data
US 2021/0329472 A1 Oct. 21, 2021

(30) Foreign Application Priority Data

Aug. 1, 2018 (CN) .......................... 201810860938.9

(51) Int. Cl.
*H04W 16/28* (2009.01)
*H04W 74/08* (2009.01)

(52) U.S. Cl.
CPC ....... *H04W 16/28* (2013.01); *H04W 74/0833* (2013.01)

(58) Field of Classification Search
CPC .......................... H04W 16/28; H04W 74/0833
See application file for complete search history.

(56) References Cited

U.S. PATENT DOCUMENTS

2017/0171830 A1 6/2017 Ji et al.
2018/0317263 A1* 11/2018 Ishii ................. H04W 74/0833
(Continued)

FOREIGN PATENT DOCUMENTS

CA 3013652 A1 8/2017
CN 106888507 A 6/2017
(Continued)

OTHER PUBLICATIONS

Mediatek, Inc., "Need of RLF Report in NR", 3GPP TSG-RAN2 NR AH#0218, R2-1810042, Montreal, Canada, Jul. 2-6, 2018.
(Continued)

*Primary Examiner* — Derrick V Rose
(74) *Attorney, Agent, or Firm* — Price Heneveld LLP

(57) ABSTRACT

An information reporting method, an information receiving method and a device are provided. The information reporting method is applied to a terminal and includes: sending, by a terminal, relevant information about an on-demand system information request to a network-side device. The information reporting method is applied to a network-side device and includes: receiving, by a network-side device, relevant information about an on-demand system information request sent by a terminal.

19 Claims, 2 Drawing Sheets

(56) References Cited

U.S. PATENT DOCUMENTS

| | | | |
|---|---|---|---|
| 2019/0223082 A1 | 7/2019 | He et al. | |
| 2019/0253956 A1* | 8/2019 | Fuhishiro | |
| 2019/0268922 A1* | 8/2019 | He | H04W 48/12 |
| 2020/0120518 A1* | 4/2020 | Geng | H04B 7/0695 |
| 2020/0288451 A1 | 9/2020 | Lee et al. | |
| 2020/0374921 A1* | 11/2020 | Li | H04W 68/005 |
| 2021/0068159 A1* | 3/2021 | Wu | H04W 52/02 |

FOREIGN PATENT DOCUMENTS

| | | |
|---|---|---|
| CN | 107645761 A | 1/2018 |
| CN | 107708151 A | 2/2018 |
| CN | 107734598 A | 2/2018 |
| CN | 107888369 A | 4/2018 |
| WO | 2018016799 A1 | 1/2018 |
| WO | 2018022570 A1 | 2/2018 |
| WO | 2018084201 A1 | 5/2018 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.2.2 (Jun. 2018), Valbonne, France.

* cited by examiner

Sending, by a terminal, relevant information about an on-demand system information request to a network-side device ⟋ 21

Receiving, by a network-side device, relevant information about an on-demand system information request sent by a terminal ⟋ 31

INFORMATION REPORTING METHOD, INFORMATION RECEIVING METHOD, AND DEVICE

CROSS-REFERENCE TO RELATED APPLICATION

This application is a U.S. national phase application of a PCT Application No. PCT/CN2019/097858 filed on Jul. 26, 2019, which claims a priority to the Chinese patent application No. 201810860938.9 filed in China on Aug. 1, 2018, a disclosure of which is incorporated herein by reference in its entirety.

TECHNICAL FIELD

The present disclosure relates to the field of mobile communications technologies, and in particular, related to an information reporting method, an information receiving method and a device.

BACKGROUND

A Long Term Evolution (LTE) system uses technologies such as Minimization Drive Test (MDT) to collect relevant information about a terminal (User Equipment, UE) in an idle state and a connected state. A network side may configure the UE to collect and record information, such as a measurement result of a current cell/neighboring cell (such as Reference Signal Receiving Power (RSRP)/Reference Signal Receiving Quality (RSRQ), etc.), location information, and radio frequency fingerprint (RF fingerprint), or detailed position information, e.g., Global Positioning System (GPS) information, a cell identity of the current cell and/or neighboring cells, a data packet delay, or a log end time, etc.

On the other hand, 5G introduces an on-demand system information (SI) acquisition mechanism. The UE in an idle state or inactive state may initiate a system information request to a base station via a message 1 (message1 or Msg1) or a message 3 (message3 or Msg3). The UE in a connected state may initiate a system information request to a base station via a dedicated signaling. Subsequently, the base station may send the requested system information to the UE via a broadcast or a dedicated signaling.

After the UE initiates an on-demand system information request, the UE needs to wait for a period of time before receiving system information sent by the network side. Moreover, when the UE is at a position far from a base station or a position where a wireless signal is seriously blocked, the wireless signal may need to be combined multiple times to correctly decode the system information. However, in related art, the network side usually does not know relevant information in a procedure of acquiring the on-demand system information on the terminal side.

SUMMARY

The present disclosure provides an information reporting method, an information receiving method and a device, so that relevant information in a procedure of acquiring on-demand system information on the terminal side is sent to the network side, the network side may refer to the above-mentioned relevant information for related processings.

To solve the above technical problem, the following schemes are provided in embodiments of the present disclosure:

An information reporting method is applied to a terminal and includes: sending, by a terminal, relevant information about an on-demand system information request to a network-side device.

Some embodiments of the present disclosure further provide an information receiving method, and the method is applied to a network-side device and includes: receiving, by a network-side device, relevant information about an on-demand system information request sent by a terminal.

Some embodiments of the present disclosure further provide a terminal, and the terminal includes a processor and a transceiver; wherein, the processor is used to record relevant information about an on-demand system information request; the transceiver is used to send the relevant information about the on-demand system information request to a network-side device.

Some embodiments of the present disclosure further provide a network-side device, and the network-side device includes a processor and a transceiver; wherein, the transceiver is used to receive relevant information about an on-demand system information request sent by a terminal.

Some embodiments of the present disclosure further provide a communication device including: a processor, a storage storing thereon a computer program, wherein when the computer program is executed by the processor, the processor implements the information reporting method or information receiving method as described above.

Some embodiments of the present disclosure further provide a computer readable storage medium including an instruction, wherein when the instruction is run on a computer, the computer is caused to implement the information reporting method or information receiving method as described above.

Beneficial effects of the above technical schemes of some embodiments of the present disclosure are as follows.

In some embodiments of the present disclosure, the terminal reports the above-mentioned relevant information to the network side, and may send the relevant information to the network side in a procedure of acquiring on-demand system information on the terminal side, so that the network side may refer to the above-mentioned relevant information for related processings. For example, the network side is helped to understand and analyze whether there is a specific time, location, and other characteristics for initiating on-demand SI, so as to provide reference opinions for subsequent sending manner of SI, for example, random access resources are planned for on-demand SI requests; further, information, such as delay and the number of combining times required for SI, is acquired correctly by the terminal, the network side may analyze downlink coverage situation to provide a reference for further network planning and optimization.

BRIEF DESCRIPTION OF THE DRAWINGS

In order to more clearly illustrate technical solutions in some embodiments of the present disclosure, drawings used in description of some embodiments of the present disclosure will be briefly introduced below. Obviously, the drawings in the following description are only some embodiments of the present disclosure. Based on these drawings, other drawings may be obtained by those skilled in the art without any creative work.

DETAILED DESCRIPTION

Figures 1, 2, 3:
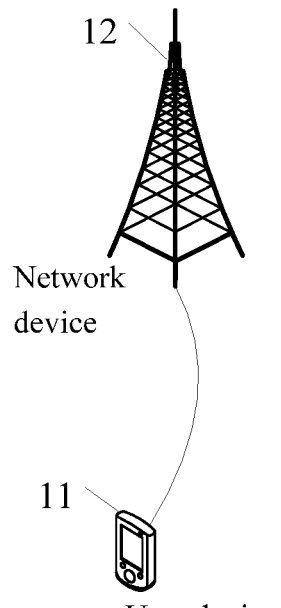
FIG. 1 is a schematic diagram of an application scenario according to some embodiments of the present disclosure.
FIG. 2 is a schematic flowchart illustrating an information reporting method provided in some embodiments of the present disclosure.
FIG. 3 is a schematic flowchart illustrating an information receiving method provided in some embodiments of the present disclosure.

Exemplary embodiments of the present disclosure will be described in more details below with reference to the accompanying drawings. Although exemplary embodiments of the present disclosure are shown in the drawings, it should be understood that the present disclosure may be implemented in various forms, without being limited by embodiments described herein. Rather, these embodiments are provided to enable a more thorough understanding of the present disclosure, and will fully convey the scope of the present disclosure to those skilled in the art.

The terms "first", "second" and the like in the specification and claims of the present application are used to distinguish similar objects, and are not necessarily used to describe a particular order or chronological order. It is to be understood that data so used may be interchangeable under appropriate circumstances, so that embodiments of the present application described herein may be implemented in a sequence other than those illustrated or described herein. In addition, such terms as "comprise", "have" and any variants thereof are intended to cover non-exclusive inclusions, for example, a process, a method, a system, a product, or a device that includes a series of steps or units is not necessarily limited to those steps or units clearly listed, but may include other steps or units not explicitly listed or inherent to such processes, methods, products or devices. The term "and/or" in the specification and claims indicates at least one of connected objects.

The technology described herein is not limited to Long Time Evolution (LTE)/LTE-Advanced (LTE-A) systems, and may also be used in various wireless communication systems, such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA) and other systems. The terms "system" and "network" are often used interchangeably. The CDMA systems may implement radio technologies such as CDMA2000 and Universal Terrestrial Radio Access (UTRA). The UTRA includes Wideband Code Division Multiple Access (WCDMA) and other CDMA variants. The TDMA systems may implement radio technologies such as Global System for Mobile Communication (GSM). The OFDMA systems may implement radio technologies such as Ultra Mobile Broadband (UMB), Evolution-UTRA (E-UTRA), IEEE 802.11 (Wi-Fi), IEEE 802.16 (WiMAX), IEEE 802.20, and Flash-OFDM. The UTRA and the E-UTRA are part of a Universal Mobile Telecommunications System (UMTS). The LTE and more advanced LTE (such as LTE-A) are new UMTS versions that use the E-UTRA. The UTRA, the E-UTRA, the UMTS, the LTE, the LTE-A, and the GSM are described in documents from an organization named "3rd Generation Partnership Project" (3GPP). The CDMA2000 and the UMB are described in documents from an organization named "3rd Generation Partnership Project 2" (3GPP2). The technologies described herein may be used for the systems and radio technologies mentioned above, as well as other systems and radio technologies. However, an LTE system and a New Radio (NR) system are described in the following description for exemplary purposes, and LTE and NR terminologies are used in most of the description below, although these technologies may also be applied to applications other than LTE and NR system applications.

The following description provides examples and does not limit the scope, applicability, or configuration set forth in the claims. Changes may be made to functions and arrangements of the discussed elements without departing from spirit and scope of the present disclosure. Various examples may be omitted, substituted, or added with various procedures or components as appropriate. For example, the described method may be performed in an order different from that described, and various steps may be added, omitted, or combined. In addition, features described with reference to certain examples may be combined in other examples.

Referring to FIG. 1, FIG. 1 shows a block diagram of a wireless communication system to which some embodiments of the present disclosure may be applied. The wireless communication system includes a user device 11 and a network device 12. The user device 11 may also be referred to as a terminal or user equipment (User Equipment, UE). The user device 11 may be a mobile phone, a tablet personal computer, a laptop computer, a personal digital assistant (PDA), a mobile Internet Device (MID), a wearable device or an in-vehicle device and other terminal-side devices, it should be noted that a specific type of the user device 11 is not limited in some embodiments of the present disclosure. The network device 12 may be a base station or a core network element, the base station may be a base station of 5G and later versions (such as, a next generation node base station (gNB), a 5G new radio base station (5G NR NB), etc.), or a base station in other communication systems (such as, an evolved node base station (eNB), an access point in a wireless local area network (WLAN), or other access points, etc.), wherein the base station may be called a Node B, an evolved Node B, an access point, a Base Transceiver Station (BTS), a radio base station, a radio transceiver, a Basic Service Set (BSS), an Extended Service Set (ESS), a NodeB, an evolved Node B (eNB), a home Node B, a home evolved Node B, a WLAN access point, a WiFi node, or some other appropriate terms in the field, as long as the same technical effect is achieved, the base station is not limited to specific technical vocabulary. It should be noted that, in some embodiments of the present disclosure, only the base station in the NR system is taken as an example, but a specific type of the base station is not limited herein.

The base station may communicate with the user device 11 under control of a base station controller. In various examples, the base station controller may be a part of a core network or part of some base stations. Some base stations may communicate control information or user data with a core network through backhaul. In some examples, some of these base stations may directly or indirectly communicate with each other through a backhaul link, and the backhaul link may be a wired or wireless communication link. The wireless communication system may support operations on multiple carriers (waveform signals of different frequencies). A multi-carrier transmitter may simultaneously transmit modulated signals on these multiple carriers. For example, each communication link may be a multi-carrier signal modulated based on various radio technologies. Each modulated signal may be sent on different carriers and may carry control information (such as, reference signals, control channels, etc.), overhead information, data, and so on.

The base station may perform wireless communication with the user device 11 via one or more access point antennas. Each base station may provide communication coverage for corresponding coverage area thereof. Coverage area of an access point may be divided into sectors that constitute only a part of the coverage area. The wireless communication system may include different types of base stations (such as, macro base stations, micro base stations, or pico base stations). The base station may also use different radio technologies, such as cellular or WLAN radio access technologies. The base stations may be associated with the same or different access networks or operator deployments. Coverage areas of different base stations (including coverage areas of the same or different types of base stations, coverage areas using the same or different radio technologies, or coverage areas belonging to the same or different access networks) may overlap.

Communication links in the wireless communication system may include an uplink for carrying uplink (UL) transmission (for example, from the user device 11 to the network device 12), or a downlink for carrying downlink (DL) transmission (for example, from the network device 12 to the user device 11). The UL transmission may also be referred to as reverse link transmission, and the DL transmission may also be referred to as forward link transmission. The downlink transmission may be performed on a licensed band, an unlicensed band or both. Similarity, the uplink transmission may be performed on a licensed band, an unlicensed band or both.

As described in the background art, relevant information in a procedure of initiating an on-demand SI request by the terminal is not reported to the network side in the related art. Some embodiments of the present disclosure provide an information reporting method, which may report the relevant information to the network side, for example, relevant information, such as delay, a geographic location, a time stamp in the process of initiating the on-demand SI request by the terminal is reported to the network side, and the network side may use the above information to perform related processing.

For example, the relevant information may help the network side understand and analyze whether there are characteristics such as a specific time and a location for initiating the on-demand SI, and provide a reference for a subsequent sending manner of SI (such as broadcast or on-demand).

For another example, the relevant information may help the network side understand whether it is necessary to enable an on-demand request based on a message 1 (Msg1, i.e., a random access request) of a random access process for a certain System Information Block (SIB). For example, when the number of on-demand SI failures of a message 3 (message3, or Msg3, i.e., Radio Resource Control (RRC) connection setup request (RRCConnectionRequest) or RRC setup request (RRCSetupRequest)) in a random access process initiated by the terminal is higher than a predetermined threshold, the network side may instruct the terminal to initiate an on-demand request based on the message 1. Further, the network side may analyze downlink coverage of the network to provide reference for further network planning and optimization through information such as the delay and number of combining times required for correct acquisition of the on-demand SI by the terminal.

Next, methods of some embodiments of the present disclosure will be introduced separately from the terminal side and the network side.

Referring to FIG. 2, some embodiments of the present disclosure provide an information reporting method applied to a source base station for handover of a terminal. As shown in FIG. 2, the method includes Step 21.

Step 21: sending, by a terminal, relevant information about an on-demand system information request to a network-side device.

As a specific implementation of Step 21 above, after the terminal enters a connected state, or when the terminal is in a procedure of entering a connected state, or when the terminal is in an idle state or an inactive state, the terminal receives a reporting request from the network-side device, and sends the relevant information about the on-demand system information request to the network-side device according to the reporting request. Further, prior to receiving the reporting request from the network-side device, the terminal reports log information to the network-side device, wherein the log information includes prompt information of the relevant information about the on-demand system information request recorded by the terminal. The network side may send the reporting request to the terminal according to the log information, to instruct the terminal to report the relevant information of the on-demand system information request.

As another specific implementation of Step 21, the terminal may initiatively send the relevant information about the on-demand system information request to the network-side device.

Prior to Step 21, the method may also include: recording, by the terminal, the relevant information about the on-demand system information request. In some embodiments of the present disclosure, the terminal may initiatively record the relevant information about the on-demand system information request or record the relevant information about the on-demand system information request according to a configuration of the network side. For example, prior to the step of sending the relevant information about the on-demand system information request to the network side device, the terminal in a connected state, an idle state or an inactive state may receive configuration information sent by the network-side device, the configuration information is used to configure the terminal to record the relevant information about the on-demand system information request, and then the terminal records, according to the configuration information, the relevant information about the on-demand system information request after the terminal enters the idle state or the inactive state. Specifically, the configuration information may indicate specific content that the terminal needs to record.

In some embodiments of the present disclosure, the relevant information about the on-demand system information request includes at least one of the followings.

A) a type of system information requested by the terminal; wherein the type may be a SIB type (such as SIB2, SIB3, etc.), or System Information, for example, a piece of System Information may include multiple SIBs.

B) first indication information used to indicate whether on-demand system information requested by the on-demand system information request is successfully acquired.

Here, in a case that the first indication information indicates that the on-demand system information requested by the on-demand system information request is successfully acquired, the relevant information about the on-demand system information request further includes at least one of: time elapsed from sending the on-demand system information request to successfully acquiring the on-demand system information; the number of combining times required to correctly decode the on-demand system information.

C) second indication information used to indicate a conveying message used for the on-demand system information request, wherein the conveying message includes a message 1 (message1, Msg1, i.e., a random access request message) and a message 3 (message3, Msg3, i.e., an RRC connection setup request message, or an RRC setup request (RRCSetupRequest)) during a random access procedure.

Here, in a case that the conveying message used for the on-demand system information request is the message 1, the relevant information about the on-demand system information request further includes at least one of: a preamble and/or Random access Occasion (RO) related information used by the conveying message.

In specific implementation, in a case that the conveying message used for the on-demand system information request is the message 1, the second indication information may be implicitly indicated by the preamble and/or the RO related information used by the conveying message. For example, if the relevant information about the on-demand system information request includes a preamble and/or RO related information, it may be implicitly indicated that the message 1 is used for the conveying message. In this case, the second indication information may not be explicitly indicated, and the explicit indication may be omitted.

D) a beam index, wherein the beam index includes at least one of: a first beam index associated with sending the on-demand system information request, a second beam index associated with successful decoding of the on-demand system information, and a third beam index associated with unsuccessful decoding of the on-demand system information.

Here, the beam index includes at least one of an intra-group beam index (inOneGroup), a group index (groupPresence), and beam bitmap information.

E) geographic location information, wherein the geographic location information includes at least one of: a first geographic location where the terminal is located when the on-demand system information request is sent, and a second geographic location where the terminal is located when the on-demand system information is successfully decoded, a third geographic location where the terminal is located when the on-demand system information is unsuccessfully decoded, and a fourth geographic location where the terminal is located when the relevant information is recorded.

F) reference time information, wherein the reference time information includes at least one of: first time when the on-demand system information request is sent, and second time when on-demand system information is successfully decoded, third time when on-demand system information is unsuccessfully decoded, and fourth time when the relevant information is recorded.

Through the above steps, in some embodiments of the present disclosure, the terminal reports the relevant information about the on-demand system information request to the network, so that the network side may perform related processing, such as network optimization and other processing, with reference to or based on the above-mentioned relevant information, thereby improving system performance.

An information reporting method in some embodiments of the present disclosure is described above from the terminal side, and further description will be made below from the network side.

Referring to FIG. 3, an information receiving method is provided in some embodiments of the present disclosure, the method is applied to a network-side device, and the network-side device may be one or more of a base station, a network management device, or other devices. As shown in FIG. 3, the method includes Step 31.

Step 31: receiving, by a network-side device, relevant information about an on-demand system information request sent by a terminal.

Details of the relevant information about the on-demand system information request may be found in the above description, which will not be repeated in order to save words.

Through the above steps, the network side may acquire the relevant information about the on-demand system information request reported by the terminal, so that the network side may perform related processing, such as network optimization and other processing, with reference to or based on the above-mentioned relevant information, thereby improving system performance.

In some embodiments of the present disclosure, prior to Step 31, the network-side device may send a reporting request to the terminal, wherein the reporting request is used to instruct the terminal to report the relevant information about the on-demand system information request, and then in Step 31, the network-side device receives the relevant information about the on-demand system information request reported by the terminal according to the reporting request.

Further, the network-side device sends the reporting request based on log information of the terminal, for example, the network-side device receives log information sent by the terminal, wherein the log information includes prompt information of the relevant information about the on-demand system information request recorded by the terminal; the network-side device sends, according to the log information, the reporting request to the terminal.

In some embodiments of the present disclosure, the network-side device sends configuration information to the terminal when the terminal is in a connected state, an idle state or an inactive state, wherein the configuration information is used to configure the terminal to record the relevant information about the on-demand system information request after the terminal enters the idle state or the inactive state, so as to indicate specific content that needs to be recorded.

The network-side device may collect relevant information about the on-demand system information requests sent by multiple terminals through the above steps, and then acquire, according to the relevant information about the on-demand system information requests sent by multiple terminals, statistical information of preambles or messages 3 used for the on-demand system information requests received within a preset time or unit time for related decision processings.

An information reporting method and an information receiving method in some embodiments of the present disclosure are described above from a terminal and a network side respectively. The above processes will be described below in combination with behavior of the network side and the terminal side.

In the above information reporting method or the information receiving method, a terminal in an idle state or an inactive state is taken as an example. First, a network-side device, such as a base station or a network management device or other network elements, configures the terminal to record the relevant information about the on-demand SI request initiated by the terminal when the terminal is in an idle or an inactive state. Specifically, the configuration may include one or more of the following.

1) recording whether on-demand SI is successfully acquired, and also recording a type of system information, such as SIB type or System Information.

2) recording time elapsed from the UE sending the on-demand SI request message to successfully receiving corresponding system information, if on-demand SI is successfully acquired.

3) recording the number of combining times required to correctly decode the SI if on-demand SI is successfully acquired, that is, how many times repeatedly sent SI is combined by the UE to correctly decode the SI.

4) a message used to send an on-demand SI request, i.e., a message1 (a random access request) or a message3 (a RRC connection setup request);

If the message used to send the on-demand SI request is a message1, used preamble and/or RO related information may further be carried. In particular, if the preamble and/or the RO related information is carried, it may be implicitly indicated that the message used to send the SI request is a message 1, and information of whether the message is a message 1 or a message 3 may not be indicated explicitly.

5) a beam index used to send an SI request and/or successfully decode SI and/or unsuccessfully decode SI, wherein the beam index includes indexes in one group (in One Group), and may also include a group index (group-Presence, only applicable to 6 GHz and above), or beam bitmap information.

6) a geographical location where the terminal is when an SI request is sent and/or when SI is successfully decoded and/or when SI is unsuccessfully decoded, and a geographical location where the terminal is when the relevant information is recorded, etc.

7) a time when an SI request is sent and/or when SI is successfully decoded and/or when SI is unsuccessfully decoded, and a time when the relevant information is recorded, etc.

Then, after the terminal enters an idle or inactive state, the terminal records relevant information about initiating the on-demand SI request that the base station requires to record; and then the terminal reports the recorded information via a new-defined message after the terminal enters a connected state, or when the terminal is in a procedure of entering a connected state, or when the terminal is in an idle/inactive state. In particular, the report may be based on a request from a network-side device, such as a base station or network manager or other devices, or the report is an initiative report by the terminal, or the report may also be sent upon request of the network side after the terminal informs the network side that there is relevant log information.

In the above information reporting method or information receiving method, a terminal in a connected state is taken as an example, the base station may configure the terminal in the connected state to record relevant information about initiating an on-demand SI request, and the terminal in the connected state records and reports the above relevant information.

In the above information reporting method or information receiving method, a base station is taken as an example, the base station may receive the number of preambles of on-demand SI requests within a preset period of time, or the number of preambles of on-demand SI requests within a unit time. The unit of the time may be second (S), so as to provide a reference for relevant processings of the base station.

Through description of the above method, it may be seen that, in some embodiments of the present disclosure, the terminal reports the relevant information to the network side to help the network side understand and analyze whether there is a specific time, location, and other characteristics for initiating on-demand SI, so as to provide reference opinions for subsequent sending manner of SI, for example, random access resources are planned for on-demand SI requests; further, information, such as delay and the number of combining times required for SI acquired correctly by the terminal, the network side may analyze downlink coverage situation to provide a reference for further network planning and optimization.

An information reporting method and an information receiving method in some embodiments of the present disclosure are described above from a terminal and a network side respectively. A related device implementing the above method will be further provided in the following.

Figure 4:
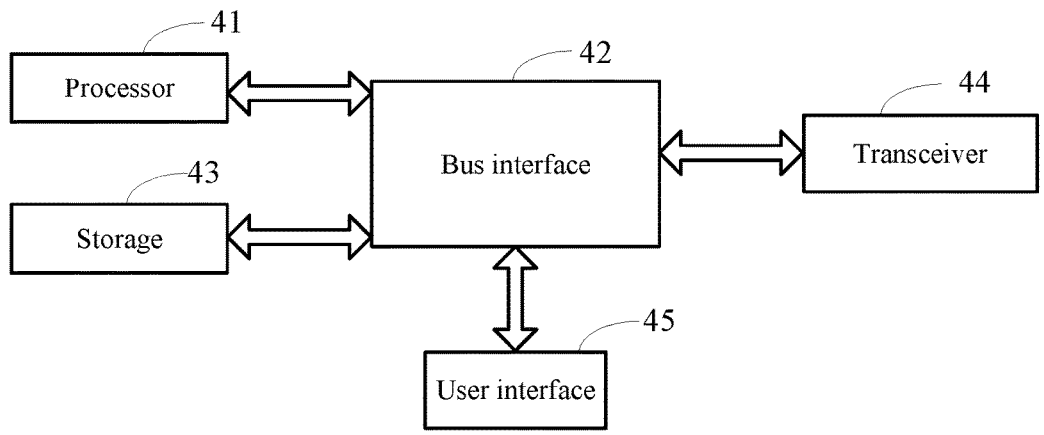
FIG. 4 is a schematic structural diagram illustrating a terminal provided in some embodiments of the present disclosure.

As shown in FIG. 4, a terminal is provided in an embodiment of the present disclosure, and the terminal includes:

a processor 41; and a storage 43 connected to the processor 41 through a bus interface 42, the storage 43 is used to store programs and data used by the processor 41 when performing operations, and the processor 41 calls and executes the programs and the data stored in the storage 43. A transceiver 44 is connected to the bus interface 42.

The processor 41 is used to record relevant information about an on-demand system information request.

The transceiver 44 is used to send the relevant information about the on-demand system information request to a network-side device.

Optionally, the relevant information about the on-demand system information request includes at least one of the followings.

A) a type of system information requested by the terminal; wherein the type may be a SIB type (such as SIB2, SIB3, etc.), or system information (System Information), for example, System Information may include multiple SIBs.

B) first indication information used to indicate whether on-demand system information requested by the on-demand system information request is successfully acquired.

Here, in a case that the first indication information indicates that the on-demand system information requested by the on-demand system information request is successfully acquired, the relevant information about the on-demand system information request further includes at least one of: time elapsed from sending the on-demand system information request to successfully acquiring the on-demand system information; the number of combining times required to correctly decode the on-demand system information.

C) second indication information used to indicate a conveying message used for the on-demand system information request, wherein the conveying message includes a message 1 (message1, Msg1, i.e., a random access request message) and a message 3 (message3, Msg3, i.e., an RRC connection setup request message (RRCConnectionRequest), or an RRC setup request (RRCSetupRequest)) during a random access process.

Here, in a case that the conveying message used for the on-demand system information request is the message 1, the relevant information about the on-demand system information request further includes at least one of: a preamble and/or Random access Occasion (RO) related information used by the conveying message.

In specific implementation, in a case that the conveying message used for the on-demand system information request is the message 1, the second indication information may be implicitly indicated by the preamble and/or the RO related information used by the conveying message. For example, if the relevant information about the on-demand system information request includes a preamble and/or RO related information, it may be implicitly indicated that the message 1 is used for the conveying message. In this case, the second indication information may not be explicitly indicated, and the explicit indication may be omitted.

D) a beam index, wherein the beam index includes at least one of: a first beam index associated with sending the on-demand system information request, a second beam index associated with successful decoding of on-demand system information, and a third beam index associated with successful decoding of on-demand system information.

Here, the beam index includes at least one of an intra-group beam index (inOneGroup), a group index (groupPresence), and beam bitmap information.

E) geographic location information, wherein the geographic location information includes at least one of: a first geographic location where the terminal is located when the on-demand system information request is sent, and a second geographic location where the terminal is located when on-demand system information is successfully decoded, a third geographic location where the terminal is located when on-demand system information is unsuccessfully decoded, and a fourth geographic location where the terminal is located when the relevant information is recorded.

F) reference time information, wherein the reference time information includes at least one of: first time when the on-demand system information request is sent, and second time when on-demand system information is successfully decoded, third time when on-demand system information is unsuccessfully decoded, and fourth time when the relevant information is recorded.

Optionally, the transceiver 44 is further used to, after the terminal enters a connected state, or when the terminal is in a procedure of entering a connected state, or when the terminal is in an idle state or an inactive state, receive a reporting request from the network-side device, and send the relevant information about the on-demand system information request to the network-side device according to the reporting request; or, initiatively send the relevant information about the on-demand system information request to the network-side device.

Optionally, the transceiver 44 is further used to, prior to receiving the reporting request from the network-side device, report log information to the network-side device, wherein the log information includes prompt information of the relevant information about the on-demand system information request recorded by the terminal.

Optionally, the transceiver 44 is further used to, prior to sending the relevant information about the on-demand system information request to the network-side device, when the terminal is in a connected state, an idle state or an inactive state, receive configuration information sent by the network-side device, wherein the configuration information is used to configure the terminal to record the relevant information about the on-demand system information request.

The processor 41 is further used to record, according to the configuration information, the relevant information about the on-demand system information request after the terminal enters the idle state or the inactive state.

It should be noted that, in FIG. 4, a bus architecture may include any number of interconnected buses and bridges. Various circuits, specifically, one or more processors represented by the processor 41 and a storage represented by the storage 43, are linked together. The bus architecture may also link various other circuits such as peripherals, voltage regulators and power management circuits, which are well known in the art, and therefore a further description thereof is omitted herein. The bus interface provides interfaces. The transceiver 44 may be a plurality of elements, that is, includes a transmitter and a transceiver, to provide units configured to communicate with various other apparatuses over a transmission medium. For different terminals, the user interface 45 can also be an interface capable of externally/internally connecting required devices which include, but are not limited to a keypad, a display, a speaker, a microphone, a joystick, and the like. The processor 41 is responsible for managing the bus architecture and general processing, and the storage 43 may store data used by the processor 41 when performing operations.

The terminal embodiment of the present disclosure corresponds to the embodiment of the above-mentioned information reporting method, and all implementation means in the above-mentioned method embodiment are applicable to the embodiment of the terminal, and the same technical effect may be achieved.

Figure 5:
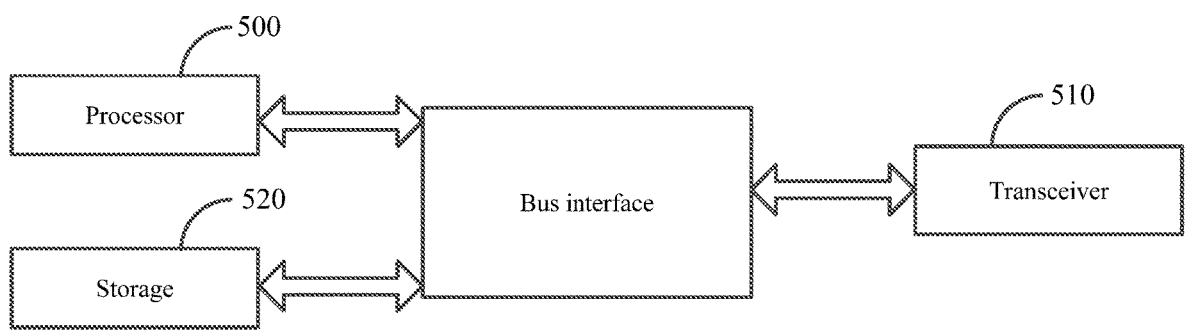
FIG. 5 is a schematic structural diagram illustrating a network-side device provided in some embodiments of the present disclosure.

Referring to FIG. 5, some embodiments of the present disclosure also provide a network-side device. The network-side device may be a base station, a network management device, or other devices. As shown in FIG. 5, the network-side device includes a processor 500 and a transceiver 510.

In some embodiments of the present disclosure, the network-side device may further include: a storage 520 connected to the processor 500 through a bus interface. The transceiver 510 is connected to the processor 500 through a bus interface. The storage 520 may store programs and data used by the processor when performing operations. The processor 500 may call and execute the programs and data stored in the storage 520.

The transceiver 510 is used to receive relevant information about an on-demand system information request sent by a terminal.

Optionally, the relevant information about the on-demand system information request includes at least one of the followings.

A) a type of system information requested by the terminal; wherein the type may be a SIB type (such as SIB2, SIB3, etc.), or System Information, for example, System Information may include multiple SIBs.

B) first indication information used to indicate whether on-demand system information requested by the on-demand system information request is successfully acquired.

Here, in a case that the first indication information indicates that the on-demand system information requested by the on-demand system information request is successfully acquired, the relevant information about the on-demand system information request further includes at least one of: time elapsed from sending the on-demand system information request to successfully acquiring the on-demand system information; the number of combining times required to correctly decode the on-demand system information.

C) second indication information used to indicate a conveying message used for the on-demand system information request, wherein the conveying message includes a message 1 (message1, Msg1, i.e., a random access request message) and a message 3 (message3, Msg3, i.e., an RRC connection setup request message (RRCConnectionRequest), or an RRC setup request (RRCSetupRequest)) during a random access process.

Here, in a case that the conveying message used for the on-demand system information request is the message 1, the relevant information about the on-demand system information request further includes at least one of: a preamble and/or Random access Occasion (RO) related information used by the conveying message.

In specific implementation, in a case that the conveying message used for the on-demand system information request is the message 1, the second indication information may be implicitly indicated by the preamble and/or the RO related information used by the conveying message. For example, if the relevant information about the on-demand system information request includes a preamble and/or RO related information, it may be implicitly indicated that the message 1 is used for the conveying message. In this case, the second indication information may not be explicitly indicated, and the explicit indication may be omitted.

D) a beam index, wherein the beam index includes at least one of: a first beam index associated with sending the on-demand system information request, a second beam index associated with successful decoding of on-demand system information, and a third beam index associated with unsuccessful decoding of on-demand system information.

Here, the beam index includes at least one of an intra-group beam index (inOneGroup), a group index (groupPresence), and beam bitmap information.

E) geographic location information, wherein the geographic location information includes at least one of: a first geographic location where the terminal is located when the on-demand system information request is sent, and a second geographic location where the terminal is located when on-demand system information is successfully decoded, a third geographic location where the terminal is located when on-demand system information is unsuccessfully decoded, and a fourth geographic location where the terminal is located when the relevant information is recorded.

F) reference time information, wherein the reference time information includes at least one of: first time when the on-demand system information request is sent, and second time when on-demand system information is successfully decoded, third time when on-demand system information is unsuccessfully decoded, and fourth time when the relevant information is recorded.

Optionally, the transceiver 510 is further used to, prior to receiving the relevant information about the on-demand system information request sent by the terminal, send a reporting request to the terminal, wherein the reporting request is used to instruct the terminal to report the relevant information about the on-demand system information request.

Optionally, the transceiver 510 is further used to: receive log information sent by the terminal, wherein the log information includes prompt information of the relevant information about the on-demand system information request recorded by the terminal; send, according to the log information, the reporting request to the terminal.

Optionally, the transceiver 510 is further used to, prior to receiving the relevant information about the on-demand system information request sent by the terminal, send configuration information to the terminal when the terminal is in a connected state, an idle state or an inactive state, wherein the configuration information is used to configure the terminal to record the relevant information about the on-demand system information request.

Optionally, the processor 500 is used to acquire, according to relevant information about the on-demand system information requests sent by multiple terminals, statistical information of preambles or messages 3 used for the on-demand system information requests received within a preset time or unit time.

In FIG. 5, a bus architecture may include any number of interconnected buses and bridges. Various circuits, specifically, one or more processors represented by the processor 500 and a storage represented by the storage 520, are linked together. The bus architecture may also link various other circuits such as peripherals, voltage regulators and power management circuits, which are well known in the art, and therefore a further description thereof is omitted herein. The bus interface provides interfaces. The transceiver 510 may be a plurality of elements, that is, includes a transmitter and a transceiver, to provide units configured to communicate with various other apparatuses over a transmission medium. The processor 500 is responsible for managing the bus architecture and general processing, and the storage 520 may store data used by the processor 500 when performing operations.

The network-side device embodiment of the present disclosure corresponds to the embodiment of the above-mentioned information receiving method, and all implementation means in the above-mentioned method embodiment are applicable to the embodiment of the network-side device, and the same technical effect may be achieved.

Those skilled in the art may understand that all or part of the steps in the embodiments may be implemented by hardware, or may be implemented by a computer program to instruct relevant hardware. The computer program includes instructions for executing part or all of the steps of the above method; and the computer program may be stored in a readable storage medium, and the storage medium may be any form of storage medium.

Figure 6:
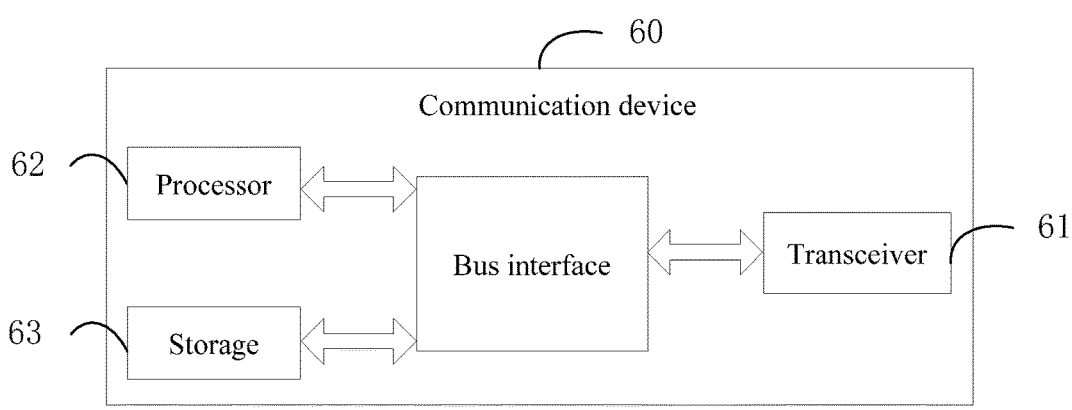
FIG. 6 is a schematic structural diagram illustrating a communication device provided in some embodiments of the present disclosure.

As shown in FIG. 6, a communication device 60 of the present disclosure includes: a processor 62, a storage 63 storing a computer program, when the computer program is run by the processor 62, the information reporting method or the information receiving method described in the foregoing embodiment are implemented.

It should be noted that the communication device may be the aforementioned network side device or terminal. The communication device may further include: a transceiver 61 communicatively connected to the processor 62 through a bus interface or an interface, and the transceiver 61 and the storage 63 may also be communicatively connected through a bus interface or an interface. The functions of the above transceiver may also be implemented by the processor. The communication device of the present disclosure may also include other components that implement the above-mentioned information reporting method or the information receiving method. All the implementation manners in the above-mentioned method embodiments are applicable to the embodiments of the communication device, and the same technical effects may also be achieved.

Some embodiments of the present disclosure further provide a computer readable storage medium including an instruction, wherein when the instruction is run on a computer, the computer is caused to implement the method as described above. Specifically, a computer program is stored on the computer readable storage medium, and the computer program is executed by a processor to implement various processes in the embodiment of the information reporting method or the information receiving method, and the same technical effect may be achieved, which will not be repeated herein to avoid repetition. The computer readable storage medium may be, for example, a Read-Only Memory (ROM), a Random Access Memory (RAM), a magnetic disk or an optical disk, etc.

Those of ordinary skills in the art will appreciate that elements and algorithm steps of various examples described in the embodiments disclosed herein may be implemented in electronic hardware or a combination of computer software and electronic hardware. Whether these functions are performed in hardware or software depends on a specific application and design constraints of a technical solution. A person skilled in the art may use different methods to implement described functions for different particular applications, but such implementation should not be considered to be beyond the scope of the present disclosure.

A person skilled in the art may clearly understand that for convenience and brevity of the description, a specific working process of the system, the device and the unit described above may be obtained by referring to a corresponding process in the foregoing method embodiments, and details thereof are not described herein again.

In embodiments provided in the present disclosure, it should be understood that the disclosed devices and methods may be implemented in other manners. For example, the device embodiments described above are merely illustrative. For example, a division of units is only a logical function division. In actual implementation, there may be another division manner, for example, a plurality of units or components may be combined or may be integrated into another system, or some features may be ignored or not be executed. In addition, mutual coupling or direct coupling or communication connection shown or discussed may be an indirect coupling or communication connection through some interfaces, devices or units, and may be in an electrical, mechanical or other form.

Units described as separate components may or may not be physically separated, and the components displayed as units may or may not be physical units, that is, may be located in one place, or may be distributed on multiple network units. Some or all of the units may be selected based on actual needs to achieve the purpose of the technical solutions of the embodiments.

In addition, each functional unit in various embodiments of the present disclosure may be integrated into one processing unit, or each unit may exist physically separately, or two or more units may be integrated into one unit.

If the functions are implemented in the form of software functional units as an independent product for sale or use, the software functional units may also be stored in a computer readable storage medium. Based upon such understanding, the technical solutions of the present disclosure essentially or a part thereof contributing to the prior art may be embodied in the form of a computer software product which may be stored in a storage medium and which includes several instructions to cause a computer device (which may be a personal computer, a server, or a network device, etc.) to perform all or some steps of the method according to the respective embodiments of the present disclosure. The foregoing storage medium includes various media that may store program codes, such as a USB flash drive, a mobile hard disk, a ROM, a RAM, a magnetic disk, or an optical disk.

In addition, it should be noted that in the device and the method of the present disclosure, it is apparent that various components or various steps may be decomposed and/or recombined. The decomposition and/or recombination should be considered as equivalents of the present disclosure. Also, the steps of performing the above-described series of processes may naturally be performed in a chronological order or in an order illustrated, but not necessarily be required to be performed in a chronological order, and some steps may be performed in parallel or independently of each other. It will be appreciated by those skilled in the art that all or any of the steps or components of the methods and devices of the present disclosure may be implemented in any computing device (including a processor, a storage medium, etc.) or a computing device network, in forms of hardware, firmware, software, or a combination thereof, which may be implemented by those of ordinary skills in the art using their basic programming skills after they read the description of the present disclosure.

Accordingly, the objective of the present disclosure may also be achieved by running a program or a set of programs on any computing device. The computing device may be a well-known general purpose device. Accordingly, the objective of the present disclosure may also be realized by merely providing a program product including program codes for implementing the method or device. That is to say, such a program product also constitutes the present disclosure, and a storage medium storing such a program product also constitutes the present disclosure. It will be apparent that the storage medium may be any known storage medium or any storage medium developed in the future. It should also be noted that in the device and the method of the present disclosure, it is apparent that various components or steps may be decomposed and/or recombined. The decomposition and/or recombination should be considered as equivalents of the present disclosure. Also, the steps of performing the series of processes described above may naturally be performed in the chronological order in the order illustrated, but not necessarily be required to be performed in the chronological order. Certain steps may be performed in parallel or independently of one another.

The descriptions above are optional embodiments of the disclosure, it should be noted that improvements and embellishments may be made by one skilled in the art without departing from the principle of the present disclosure, and such improvements and embellishments shall be within the protection scope of the present disclosure.

What is claimed is:

1. An information reporting method, applied to a terminal, comprising:

after the terminal requests or acquires on-demand system information through a random access procedure, sending, by a terminal, relevant information about requesting or acquiring the on-demand system information to a network-side device, wherein the relevant information about requesting or acquiring the on-demand system information is recorded by the terminal, wherein, the relevant information about requesting or acquiring the on-demand system information comprises at least one of:

first indication information used to indicate whether on-demand system information being requested is successfully acquired or not;

second indication information used to indicate a conveying message used for requesting the on-demand system information, wherein the conveying message comprises a message 1 or a message 3 during the random access procedure;
a beam index, wherein the beam index comprises at least one of: a first beam index associated with requesting the on-demand system information, a second beam index associated with successful decoding of the on-demand system information, and a third beam index associated with unsuccessful decoding of the on-demand system information;
geographic location information, wherein the geographic location information comprises at least one of: a first geographic location where the terminal is located when the on-demand system information is requested, and a second geographic location where the terminal is located when the on-demand system information is successfully decoded, a third geographic location where the terminal is located when the on-demand system information is unsuccessfully decoded, and a fourth geographic location where the terminal is located when the relevant information is recorded;
reference time information, wherein the reference time information comprises at least one of: first time when the on-demand system information is requested, and second time when the on-demand system information is successfully decoded, third time when the on-demand system information is unsuccessfully decoded, and fourth time when the relevant information is recorded,
wherein after the terminal requests or acquires the on-demand system information through the random access procedure, sending, by the terminal, the relevant information about requesting or acquiring the on-demand system information to the network-side device comprises:
receiving, by the terminal, a reporting request from the network-side device, and according to the reporting request, sending the relevant information about requesting or acquiring the on-demand system information to the network-side device; or
initiatively sending, by the terminal to the network-side device, the relevant information about requesting or acquiring the on-demand system information.

2. The method according to claim 1, wherein, the relevant information about requesting or acquiring the on-demand system information further comprises:
a type of system information requested by the terminal using the message 1 or the message 3 during the random access procedure.

3. The method according to claim 1, wherein, in a case that the first indication information indicates that the on-demand system information being requested is successfully acquired, the relevant information about requesting or acquiring the on-demand system information further comprises at least one of:
time elapsed from requesting the on-demand system information to successfully acquiring the on-demand system information;
the number of combining times required to correctly decode the on-demand system information.

4. The method according to claim 1, wherein, in a case that the conveying message used for requesting the on-demand system information is the message 1, the relevant information about requesting or acquiring the on-demand system information further comprises at least one of:
a preamble and/or Random access Occasion (RO) related information used by the conveying message.

5. The method according to claim 4, wherein, in a case that the conveying message used for requesting the on-demand system information is the message 1, the second indication information is implicitly indicated by the preamble and/or the RO related information used by the conveying message.

6. The method according to claim 1, wherein, the beam index comprises at least one of an intra-group beam index, a group index (groupPresence), and beam bitmap information.

7. The method according to claim 1, wherein, the relevant information about requesting or acquiring the on-demand system information is sent to the network-side device after the terminal enters a connected state, or when the terminal is in a procedure of entering a connected state, or when the terminal is in an idle state or an inactive state.

8. The method according to claim 1, wherein, prior to receiving the reporting request from the network-side device, the method further comprises:
reporting, by the terminal, log information to the network-side device, wherein the log information comprises prompt information that the terminal records the relevant information about requesting or acquiring the on-demand system information.

9. The method according to claim 1, wherein, prior to sending the relevant information about requesting or acquiring the on-demand system information to the network-side device, the method further comprises:
receiving, by the terminal in a connected state, an idle state or an inactive state, configuration information sent by the network-side device, wherein the configuration information is used to configure the terminal to record the relevant information about requesting or acquiring the on-demand system information;
recording, by the terminal according to the configuration information, the relevant information about requesting or acquiring the on-demand system information, after the terminal enters the idle state or the inactive state.

10. An information receiving method, applied to a network-side device, comprising:
receiving, by the network-side device, relevant information about requesting or acquiring on-demand system information, wherein the relevant information about requesting or acquiring on-demand system information is record by a terminal and is sent by a terminal after the terminal requests or acquires the on-demand system information through a random access procedure,
wherein, the relevant information about requesting or acquiring the on-demand system information comprises at least one of:
first indication information used to indicate whether on-demand system information being requested is successfully acquired or not;
second indication information used to indicate a conveying message used for requesting the on-demand system information, wherein the conveying message comprises a message 1 or a message 3 during the random access procedure;
a beam index, wherein the beam index comprises at least one of: a first beam index associated with requesting the on-demand system information, a second beam index associated with successful decoding of the on-demand system information, and a third beam index associated with unsuccessful decoding of the on-demand system information;

geographic location information, wherein the geographic location information comprises at least one of: a first geographic location where the terminal is located when the on-demand system information is requested, and a second geographic location where the terminal is located when the on-demand system information is successfully decoded, a third geographic location where the terminal is located when the on-demand system information is unsuccessfully decoded, and a fourth geographic location where the terminal is located when the relevant information is recorded;

reference time information, wherein the reference time information comprises at least one of: first time when the on-demand system information is requested, and second time when the on-demand system information is successfully decoded, third time when the on-demand system information is unsuccessfully decoded, and fourth time when the relevant information is recorded, wherein prior to receiving the relevant information about requesting or acquiring the on-demand system information, the method further comprises: sending, by the network-side device, a reporting request to the terminal, wherein the reporting request is used to instruct the terminal to report the relevant information about requesting or acquiring the on-demand system information, and the network-side device receives the relevant information, about requesting or acquiring the on-demand system information, sent by the terminal according to the reporting request; or wherein the network-side device receives the relevant information, about requesting or acquiring the on-demand system information, sent initiatively by the terminal.

11. The method according to claim 10, wherein, the relevant information about requesting or acquiring the on-demand system information further comprises:

a type of system information requested by the terminal using the message 1 or the message 3 during the random access procedure.

12. The method according to claim 10, wherein, in a case that the first indication information indicates that the on-demand system information being requested is successfully acquired, the relevant information about requesting or acquiring the on-demand system information further comprises at least one of:

time elapsed from requesting the on-demand system information to successfully acquiring the on-demand system information;

the number of combining times required to correctly decode the on-demand system information.

13. The method according to claim 10, wherein, in a case that the conveying message used for requesting the on-demand system information is the message 1, the relevant information about requesting or acquiring the on-demand system information further comprises at least one of:

a preamble and/or Random access Occasion (RO) related information used by the conveying message.

14. The method according to claim 13, wherein, in a case that the conveying message used for requesting or acquiring the on-demand system information is the message 1, the second indication information is implicitly indicated by the preamble and/or the RO related information used by the conveying message.

15. The method according to claim 10, wherein, the beam index comprises at least one of an intra-group beam index, a group index (groupPresence), and beam bitmap information.

16. The method according to claim 10, wherein, sending the reporting request to the terminal comprises:

receiving, by the network-side device, log information sent by the terminal, wherein the log information comprises prompt information that the terminal records the relevant information about requesting or acquiring the on-demand system information;

sending, by the network-side device according to the log information, the reporting request to the terminal.

17. The method according to claim 10, wherein, prior to receiving the relevant information about requesting or acquiring the on-demand system information, the method further comprises:

sending, by the network-side device, configuration information to the terminal when the terminal is in a connected state, an idle state or an inactive state, wherein the configuration information is used to configure the terminal to record the relevant information about requesting or acquiring the on-demand system information.

18. A communication device, comprising:

a processor, a storage storing thereon a computer program, wherein when the computer program is executed by the processor, the processor implements the information reporting method according to claim 1.

19. A communication device, comprising:

a processor, a storage storing thereon a computer program, wherein when the computer program is executed by the processor, the processor implements the information receiving method according to claim 10.

* * * * *